Patented Jan. 20, 1953

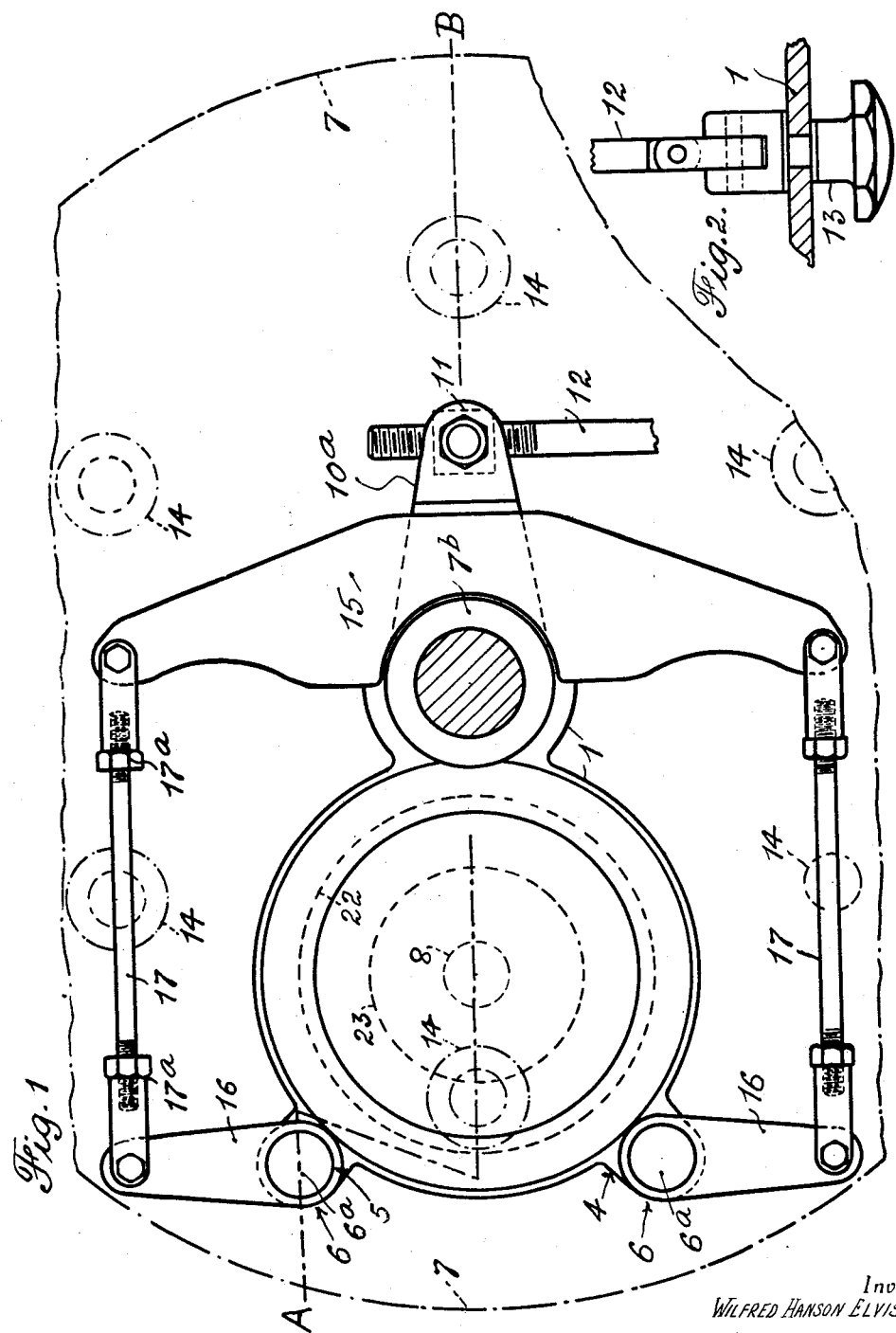

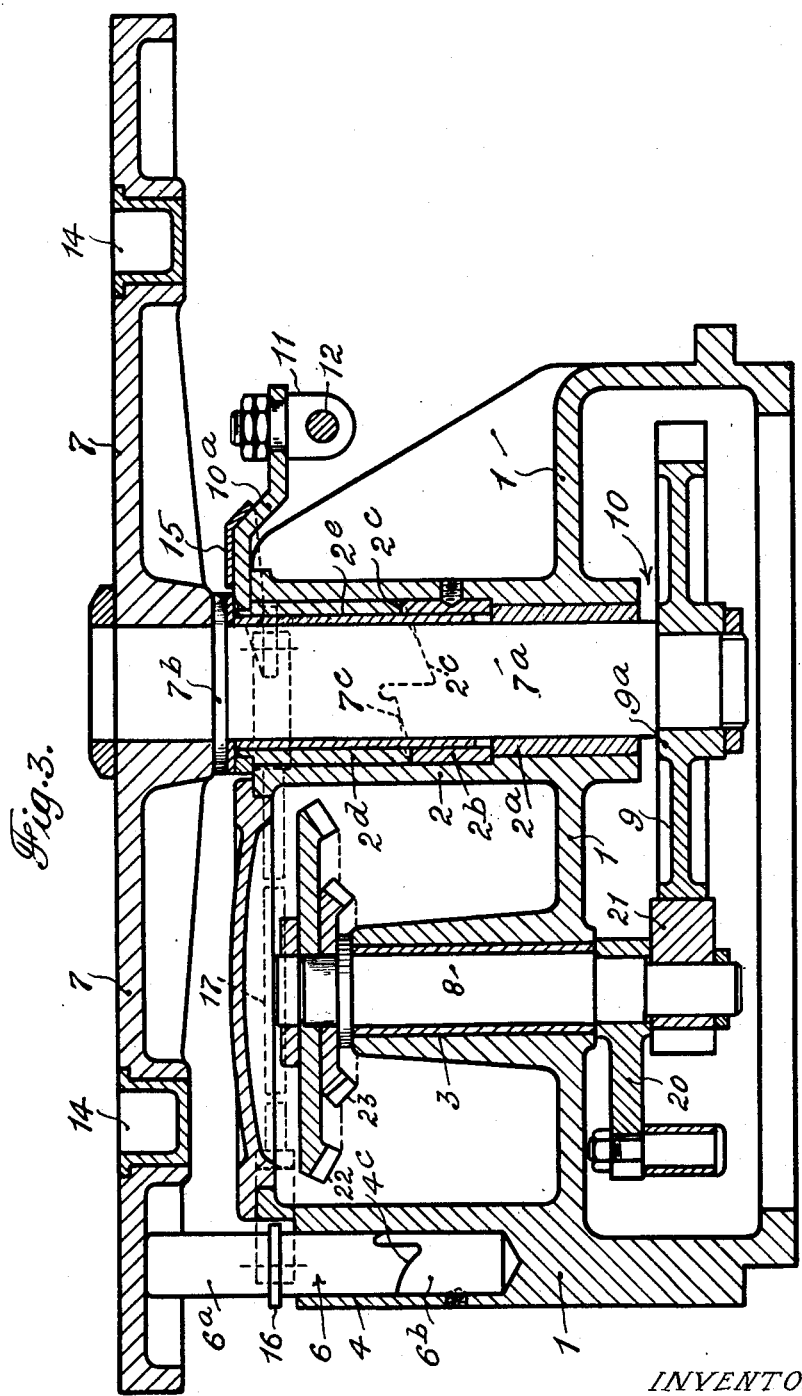

2,625,892

UNITED STATES PATENT OFFICE 2,625,892

PIE AND LIKE MOLDING MACHINE

Wilfred Hanson Elvis, Birmingham, England, assignor, by mesne assignments, to Concentric Manufacturing Co. Limited, Birmingham, England Application August 1, 1947, Serial No. 765,365
In Great Britain March 22, 1946

Section 1, Public Law 690, August 8, 1946
Patent expires March 22, 1966

2 Claims. (Cl. 107—15)

The invention relates to a machine for moulding pastry such as into pie bodies of the kind having a horizontal table mounted about a depending shaft and carrying a plurality of distanced open-top moulds, to be filled one at a time with dough, and adapted to be intermittently revolved with the shaft to move one mould at a time to a moulding and trimming station and beneath a moulding and trimming plunger provided to operate above the table and to have a corresponding intermittent vertical reciprocation to the revolution of said table, the said machine being automatic in operation except for the hand-filling of the moulds with dough, the removal from the table of surplus trimmings, and the removal from the moulds of the moulded articles.

In order to regulate the thickness of the bottom of the moulded article, such as the bottom of a pie body, it has been the practice to effect a slight lifting and lowering of the table by the application to the mounting thereof of different thicknesses of washers; a tedious and difficult operation, particularly as delicate adjustment of thickness is required.

The invention provides a machine of the kind and for the purpose wherein the table, its shaft and the mountings therefor are provided with adjustable mechanism to finely effect the raising or lowering of the table to any required degree within small limits without stopping the operation of said machine, or without requiring any skill or application of separate mechanical features; the mechanism being built-in as a part of the machine.

According to the invention the horizontal table is carried upon the upper end of an intermittently rotatable shaft disposed vertically for support within and upon a tubular member surrounding said shaft and capable of being lifted and lowered within small limits by part revolution of it and by the operation of concentric inclined plane or spiral-cam devices disposed between the lower edge of the tubular member and the upper edge of a fixed tubular sleeve of the same external and internal diameter as the member, said part revolution being effected by manipulation of lever links and screwthreaded devices; the table being liftable or lowerable to any minute degree and maintained so adequately supported while being revolved.

The concentric inclined plane or spiral-cam devices are provided to surround the shaft and to operate vertically between the table support and the stationary frame of the machine, so that the table can be lifted or lowered to any minute degree at any time and be adequately supported during revolution.

Further and according to the invention subsidiary supports operating by corresponding inclined planes to lift and lower them are provided in the machine underneath the table on each side of each mould as it arrives at the pressure station of the moulding and trimming plunger, these supports to lift and lower equally and simultaneously with the table.

A pie or like moulding machine according to the invention is represented by the accompanying sheets of drawings.

Fig. 1 is a plan, the table being removed but indicated by dotted lines.

Fig. 2 is a detail of a manually operable means.

Fig. 3 is a vertical section of Fig. 1 (including the table) taken on the chain lines A, B, this section being an exaggerated one for the purpose of clarity.

The vertical frame of the machine is indicated by the numeral 1 and is adapted to be secured at its base upon any suitable supporting underframe. Said frame provides parallel vertical sleeves 2 and 3, and two parallel vertical sockets 4 and 5, the sockets to each accommodate a subsidiary support 6 for the horizontal table 7 at the operative station of the moulding and trimming plunger (not shown), and the sleeves to accommodate, respectively, the table shaft 7a and a shaft 8 for the gear for revolution of said table shaft.

Permanently fixed within the bottom of the sleeve 2 is a tubular axial bush 2a, and resting vertically upon this bush is a non-rotatable tubular and axial collet 2b whose upper end is formed with a concentric inclined plane or cam surface 2c. Within the sleeve 2 above the collet 2b is a revoluble and slidable axial tubular member 2d upon which a collar 7b of the shaft 7a is supported, the underside of said member being provided with a counter-part inclined or cam surface 7c to co-operate with the surface of the collet 2b. Between the collet 2b and the tubular member 2d is an anti-frictional liner 2e surrounding the shaft 7a. The table 7 is rigidly mounted upon the shaft 7a to be vertically supported by the collar 7b, while upon the lower end of the shaft 7a is fixed a gear wheel 9 adapted to be revolved intermittently from the shaft 8 and to be held stationary while a moulding and trimming plunger operates at the moulding and trimming station. The gear wheel 9 together with the shaft 7a is capable of a small amount of vertical movement within limits provided by the space 19 between the underside of the bush 2a and the central boss 9a of the gear wheel for the lifting and lowering action of the inclined or cam surfaces 2c and 7c.

Fixed to the upper end of the tubular member 2d is a rigid horizontal arm 10a adapted to lift and lower and partly revolve with said member, the outer end of this arm being connected to a swivel nut 11 with which a screwthreaded horizontal operating rod 12 engages, as clearly shown in Fig. 1, this rod having universal connection with a hand knob 13 revoluble in the frame 1 as clearly shown in Fig. 2. Rotation of the knob 13 will swing the arm 10 about the axis of the shaft 7a, and therefore will partially revolve the tubular member 2d and bring the inclined or cam surfaces into action.

The horizontal table 7 carries a number of moulds 14 (6 are indicated) and the one on the left of Fig. 2 is at the moulding and trimming station to be supported by the two supports 6, 6, one at each side of said mould, these supports being common to all the moulds as they are brought one at a time into position for use.

Each vertical support 6 engages a socket 4 in the frame 1 and comprises upper and lower members 6a and 6b, the latter being fixed within the lower part of the socket and the upper member slidable and revoluble therein. Between the two members co-operative inclined plane or cam surfaces 4c are provided in reverse order and relatively corresponding with the inclined plane or cam surfaces of the collet 2b and tubular members 2d, so that if the upper members 4a are relatively revolved together with the tubular member 2d the vertical supports 6 will always contact the underside of the table and will support said table at the moulding and trimming station.

The tubular member 2d and the upper members 6a, 6a, are connected for operation together by a yoke 15, lever arms 16, 16, and pivoted coupling rods 17, 17. The lever arms 16, 16 project rigidly from the upper members 6a, 6a, the yoke 15 is fixed to the arm 10a, and the coupling rods 17, 17 connect these arms and are adjustable as to length at 17a; such mechanism providing a true parallel action between the yoke 15 and the arms 16, 16, under control of the arm 10a from operation of the knob 13. The tubular member 2d and the upper members 6a, 6a, can therefore be lifted and lowered together with the table 7 at any time under control of the hand operated mechanism of which the knob 13 is a part, and in this way the height of the table finely adjusted to determine the thickness of the dough bottom of the moulded article and such adjustment maintained.

The gear wheel 9 is revolved intermittently by a crank arm 20 to similarly revolve the shaft 7a and table 7, and during a moulding and trimming operation is held stationary by an eccentric member 21, both crank and eccentric member being operated from the shaft 8 from one of the driven gear wheels 22 or 23, these particular features not of themselves forming any part of the invention.

The drawings show the table 7 and supports 6, 6, in lowest position with the inclined plane or cam surfaces touching. By turning the knob 13 clockwise the table can be lifted bodily from the cam surfaces 7c and 2c, to a fine adjustment and be held so lifted, the two upper members 6a, 6a automatically moving up with the table to give thereto constant support each side the moulding station.

What I claim is:

1. In a pastry moulding machine of the kind described: a supporting frame; a vertical tubular bearing within the frame; a shaft supported by the bearing and having fixed to its upper end a pastry moulding table top to rotate with the shaft; means for intermittently rotating said shaft and table top; a fixed tubular collet and a revoluble tubular member arranged one above the other concentrically between the bearing and shaft to support the shaft and table top vertically within the bearing, said collet and member having co-acting spiral cam surfaces on their abutting ends; and manually operable adjusting means on the frame operatively connected to said tubular member to revolve the tubular member relative to the fixed collet to raise or lower the table top by the operation of the spiral cam surfaces while said table top is either revolved or at rest, said means also operable to hold in fixed relation the adjusted position of the shaft and the table top.

2. In a pastry moulding machine of the kind described, a supporting frame, a vertical tubular bearing and two parallel vertical sockets within the frame, the sockets being disposed a distance apart each side the moulding and trimming station, a shaft supported by the bearing and having fixed to its upper end a pastry moulding table top to rotate with the shaft, means for intermittently rotating said shaft and table top; a fixed tubular collet and a revoluble tubular member arranged one above the other concentrically between the bearing and shaft to support the shaft and table top vertically within the bearing, said collet and member having co-acting spiral cam surfaces on their abutting ends, subsidiary supports for the table top applied to the two parallel vertical sockets at the moulding station and each comprising a stationary lower member and a partly revolvable upper member, said two members having reversed spiral cam surfaces at their adjacent abutting ends corresponding in relative operation to the cam surfaces of the collet and member of the shaft, and manually operable adjusting means on the frame operatively connected to said tubular member and to the upper members of the subsidiary supports whereby said tubular member and said upper members of the supports are lifted and lowered together with the lifting and lowering of the table top and to the same degree and are held in fixed relation in their adjusted position, substantially as described.

WILFRED HANSON ELVIS.

REFERENCES CITED

The following references are of record in the file of this patent:

UNITED STATES PATENTS

| Number | Name | Date |
|---|---|---|
| 501,521 | Marsh | July 18, 1893 |
| 666,805 | Hardel | Jan. 29, 1901 |
| 1,133,804 | Kaufman | Mar. 30, 1915 |
| 1,756,527 | Thompson | Apr. 29, 1930 |
| 2,123,230 | Clark et al. | July 12, 1938 |